United States Patent
Karnin et al.

(10) Patent No.: US 7,035,354 B2
(45) Date of Patent: Apr. 25, 2006

(54) CDMA MULTI-USER DETECTION WITH A REAL SYMBOL CONSTELLATION

(75) Inventors: Ehud Karnin, D.N. Mishgav (IL); Shay Ben-David, Haifa (IL); Jacob Sheinvald, Nofit (IL)

(73) Assignee: International Business Machine Corporation, Armonk, NY (US)

( * ) Notice: Subject to any disclaimer, the term of this patent is extended or adjusted under 35 U.S.C. 154(b) by 821 days.

(21) Appl. No.: 09/917,837

(22) Filed: Jul. 31, 2001

(65) Prior Publication Data

US 2002/0101910 A1    Aug. 1, 2002

Related U.S. Application Data

(60) Provisional application No. 60/254,147, filed on Dec. 8, 2000.

(51) Int. Cl.
  H04L 27/06  (2006.01)
(52) U.S. Cl. .................. 375/341; 375/322; 375/323; 375/324; 375/329; 375/334; 375/336; 375/340
(58) Field of Classification Search .............. 375/340, 375/341, 349
See application file for complete search history.

(56) References Cited

U.S. PATENT DOCUMENTS

| | | |
|---|---|---|
| 5,151,919 A | 9/1992 | Dent |
| 5,218,619 A | 6/1993 | Dent |
| 5,363,403 A | 11/1994 | Schilling et al. |
| 5,553,062 A | 9/1996 | Schilling et al. |
| 5,644,592 A | 7/1997 | Divsalar et al. |
| 5,719,852 A | 2/1998 | Schilling et al. |
| 5,872,776 A | 2/1999 | Yang |
| 6,014,373 A | 1/2000 | Schilling et al. |
| 6,175,550 B1 * | 1/2001 | van Nee ..................... 370/206 |
| 6,366,938 B1 * | 4/2002 | Levison et al. ............. 708/422 |
| 6,434,375 B1 * | 8/2002 | Chulajata et al. ......... 455/276.1 |
| 6,473,467 B1 * | 10/2002 | Wallace et al. ............. 375/267 |
| 2002/0131524 A1 * | 9/2002 | Demjanenko et al. ...... 375/298 |

OTHER PUBLICATIONS

Duel-Hallen, "A Family of Multiuser Decision-Feedback Detectors for Asynchronous Code-Division Multiple-Access Channels", *IEEE Transactions on Communications*, (1995), vol. 43, No. 2/3/4, pp. 421-434.

Klein et al., "Zero Forcing and Minimum Mean-Square-Error Equalization for Multiuser Detection in Code-Division Multiple-Access Channels", *IEEE Transactions on Communication*, (1996), vol. 45, No. 2, pp. 276-287.

(Continued)

*Primary Examiner*—Mohammed Ghayour
*Assistant Examiner*—Freshteh N Aghdam
(74) *Attorney, Agent, or Firm*—Browdy and Neimark, PLLC

(57) ABSTRACT

A method for multi-user detection includes receiving a complex input signal due to a superposition of waveforms encoding symbols in a real-valued constellation, which are transmitted respectively by a plurality of transmitters in a common frequency band. The complex input signal is sampled at sampling intervals over the duration of an observation period to provide a sequence of complex samples. The sequence of complex samples is processed to determine soft decision values corresponding to the symbols transmitted by the plurality of the transmitters in the observation period, while constraining the soft decision values to be real values. The soft decision values are then projected onto the constellation to estimate the transmitted symbols.

22 Claims, 4 Drawing Sheets

OTHER PUBLICATIONS

Giallorenzi et al., "Decision Feedback Mulitiuser Receivers for Asynchronous CDMA Systems", (1993), pp. 1677-1682.

Divsalar et al., "Improved CDMA Performance Using Parallel Interference Cancellation", *IEEE Transactions on Communications*, (1994), pp. 911-917.

Duel-Hallen, Decorrelating Decision feedback Multiuser Detector for Synchronous Code-Division Multiple-Access Channel.

Moshavi, "Multi-User Detection for DS-CDMA Communications", *IEEE Communications Magazine*, (1996), pp. 124-136.

Lupas et al., "Linear Multiuser Detectors for Synchronous Code-Division Multiple-Access Channels", *IEEE Transactions on Communications*, (1989), vol. 35, No. 1, pp. 123-136.

Verdu, "Minimum Probability of Error for Asynchronous Gaussian Multiple-Access Channels", *IEEE Transactions on Communications*, (1986), vol. IT-32, No. 1, pp. 85-89.

Golub et al., "Matrix Computations", *Johns Hopkins Series in Mathematical Sciences*, (1996), pp. 222-229.

Presentation: "CDMA-Multiuser Detection", By Jacob Sheinvald (2000).

Sheinvald et al., "Improving CDMA Multi-user Detection by Constraining the Soft Decisions", *IBM Research Lab*, (2000), pp. 1-22.

* cited by examiner

CDMA MULTI-USER DETECTION WITH A REAL SYMBOL CONSTELLATION

CROSS-REFERENCE TO RELATED APPLICATION

This application claims the benefit of U.S. Provisional Patent Application No. 60/254,147, filed Dec. 8, 2000, which is incorporated herein by reference.

FIELD OF THE INVENTION

The present invention relates generally to digital signal processing, and specifically to methods and systems for simultaneous reception and processing of signals from multiple transmitters sharing a common frequency band using code-division multiple access (CDMA).

BACKGROUND OF THE INVENTION

CDMA is widely used in cellular and other wireless systems for multiplexing communications among multiple users on a common frequency band. In direct-sequence (DS) CDMA, the transmitter multiplies each user's signal by a distinct code waveform. The code waveforms of the different users have the form of "pseudo-noise" (PN) sequences, also known as spreading codes, and are chosen so as to be as much as possible mutually orthogonal. The receiver receives a composite signal made up of the sum of all of the users' signals, which overlap in time and frequency. To recover the individual signal of a given user, the receiver correlates the composite signal with that user's distinct code.

Multiple access interference (MAI) limits the capacity and performance of DS-CDMA systems. MAI results from the lack of complete orthogonality between the spreading codes, due to random time offsets between the signals of different users, for example. MAI becomes increasingly problematic as the number of interfering users and their power increases, particularly when there are power imbalances among the users. These imbalances typically result from differences in distance between the users and the base station, as well as from fading and other factors that affect signal power. The problems caused by MAI have led a number of groups to develop multi-user detection techniques, in which information about multiple users and their respective code waveforms is used jointly to better detect each individual user. A survey of these techniques is presented by Moshavi in "Multi-User Detection for DS-CDMA Communications," *IEEE Communications Magazine* (October, 1996), pages 124–136, which is incorporated herein by reference.

To formulate the multi-user detection problem, we consider a CDMA receiver that receives signals from K users. The received complex-envelope baseband signal x(t) is a superposition of the users' individual signal waveforms, including channel distortion and additive noise n(t):

$$x(t) = \sum_{k=1}^{K} h_k(t) * \xi_k(t) + n(t) \quad (1)$$

Here "*" denotes convolution, and $h_k(t)$ is the impulse response of the kth user channel (including delay, attenuation, multipath and filtering effects). In the derivation that follows, n(t) is assumed to be Gaussian with mean zero and without correlation between successive noise samples.

The kth user's signal waveform is given by:

$$\xi_k(t) = \sum_{m=-\infty}^{\infty} b_k(m) p_{T_b}(t - mT_b) c_k(t) \quad (2)$$

In this equation, $b_k(m)$ is the mth symbol transmitted by the kth user, wherein $b_k$ is selected from a predefined constellation (or alphabet) A. For binary phase shift keying (BPSK), which is the most common modulation scheme in current cellular systems, $b_k$ is a bit selected from A={−1,1}. $T_b$ is the symbol duration, and $p_T(t)$ is a rectangular pulse with unity value in t ∈[0,T) and zero elsewhere. $c_k(t)$ is a complex-valued PN spreading waveform, with a chip period $T_c = T_b/N$, wherein N is the spreading gain of the DS modulation:

$$c_k(t) = \sum_{i=-\infty}^{\infty} \frac{1}{\sqrt{2}} [\gamma_k^{(I)}(i) + j \gamma_k^{(Q)}(i)] p_{T_c}(t - iT_c) \quad (3)$$

$\gamma_k^{(I)}(i)$ and $\gamma_k^{(Q)}(i)$ are independently drawn from {−1,1} with uniform distribution.

The multi-user detection problem can be stated as follows: Let the received signal x(t) be sampled, and assume that the impulse responses $h_k(t)$ and the spreading waveforms $c_k(t)$ are known. Now estimate the symbols $b_k(m)$ from the samples x(t) for all k and m. For the sake of simplicity in framing the problem, it is assumed that the impulse responses of the channels can be expressed as complex scalars $h_k$, that the user signals are mutually synchronized, and that the samples are taken at mid-chip, at a sampling rate equal to the chip rate (i.e., N samples per symbol). It is possible to relax some of these assumptions and still achieve multi-user detection, as described hereinbelow.

The symbols transmitted by the K users at symbol interval m can be written as a K×1 real vector:

$$b(m):=(b_1(m), \ldots b_K(m))^T \quad (4)$$

The samples taken during the mth symbol interval can be arranged as a N×1 complex vector x(m). Rearranging equations (1) and (2) in similar vector form gives the following expression:

$$x(m)=S(m)b(m)+n(m) \quad (5)$$

Here n(m) is a N×1 complex vector of noise samples. S(m) is a complex N×K matrix, whose kth column is a signature vector $s_k(m)$ representing the "symbol signature" of the kth user during the mth symbol interval. The elements of the signature vectors $s_k(m)$ are samples of the following waveform:

$$S_k(t; m):=h_k c_k(t), \ mT_b \le t \le (m+1)T_b \quad (6)$$

Given the known elements of x(m) and S(m), in order to solve the multi-user detection problem it is necessary to find the elements of b(m) that best satisfy equation (5). An optimal, maximum-likelihood solution to this problem was framed by Verdu in "Minimum Probability of Error for Asynchronous Gaussian Multiple-Access Channels," *IEEE Transactions on Information Theory* 32:1 (January, 1986), pages 85–96, which is incorporated herein by reference. According to this solution, for each m, we find the elements of b within the applicable constellation A ({−1,1} for BPSK, as noted above) that minimize $\|x-Sb\|^2$. (For brevity, here and below, we write simply b, S and x to represent b(m), S(m) and x(m).) Although optimal, this detector is usually impractical, since it requires an exhaustive search over all possible $b \in A^K$.

As a less costly (though suboptimal) alternative, Lupas and Verdu proposed a decorrelating detector in "Linear Multi-User Detectors for Synchronous Code-Division Multiple Access Channels," *IEEE Transactions on Information Theory* 35:1 (January, 1989), pages 123–136, which is also incorporated herein by reference. The decorrelating detector finds a vector $\tilde{b}$ that minimizes $\|x-Sb\|^2$ over $b \in C^K$, wherein C is the complex plane. The "soft decision" vector $\tilde{b}$ is projected onto the constellation $A^K$ to arrive at the hard decision output $\hat{b}$. For BPSK modulation, the elements $\hat{b}_k$ are given simply by the sign of the real part of the corresponding elements $\tilde{b}_k$. Assuming $K \leq N$ and full column-rank S, the soft decision solution is given by:

$$\tilde{b} = (S^H S)^{-1} S^H x \qquad (7)$$

wherein $S^H$ is the conjugate transpose of S.

The decorrelating detector has been found to provide substantial performance gains over conventional single-user detection, with significantly lower computational complexity than the maximum-likelihood detector proposed previously. It performs well even in the presence of substantial power imbalances among the users. It still entails a substantial computational burden, however, in inverting the matrix $S^H S$.

A number of different solutions have been proposed in order to improve multi-user detection performance. For example, Duel-Hallen suggests combining the decorrelating detector with decision feedback, in "Decorrelating Decision-Feedback Multiuser Detector for Synchronous Code-Division Multiple-Access Channel," *IEEE Transactions on Communications* 41:2 (February, 1993), pages 285–290, which is incorporated herein by reference. This detector generates decisions $\hat{b}_k$ iteratively, working down from the stronger user signals to the weaker signals. The decisions made with respect to the stronger users are used in forming decisions for the weaker ones. The decision-feedback detector has been found to outperform the original decorrelating detector as long as the bit-error rate (BER) is not too high, and reliable estimates of the channel gains $h_k$ are available.

Various other technique have been suggested in the patent literature for canceling interference among the signals received from multiple CDMA users. For example, U.S. Pat. No. 5,644,592, to Divsalar et al., whose disclosure is incorporated herein by reference, describes a method of parallel interference cancellation, which estimates and subtracts out all of the interference for each user in parallel. U.S. Pat. Nos. 5,363,403, 5,553,062, 5,719,852 and 6,014,373, all to Schilling et al., whose disclosures are also incorporated herein by reference, describe methods for solving the $(S^H S)^{-1}$ matrix using a fast polynomial expansion.

SUMMARY OF THE INVENTION

Preferred embodiments of the present invention provide simpler, more efficient methods and systems for detecting CDMA multi-user symbols, particularly BPSK symbols, using a real statistical model that inherently incorporates prior knowledge that the symbols are real-valued. As described above, decorrelating detectors known in the art calculate complex-valued soft decisions ($\tilde{b}_k$), and then project these values onto the actual constellation of the user signals to generate the corresponding hard decisions ($\hat{b}_k$). In the case of BPSK modulation, however, the constellation consists of the real values ±1, so that $\hat{b}_k$ must be real, even if the user waveforms themselves are complex due to the use of complex PN signatures.

Therefore, in preferred embodiments of the present invention, the soft decisions themselves are constrained a priori to the real axis. This constraint reduces by half the number of unknown parameters that must be solved for, by eliminating the need to find the imaginary part of $\tilde{b}_k$. Application of the constraint thus simplifies the decorrelation calculation, improves detection performance and doubles the number of users that can be detected simultaneously. This constrained decorrelation approach is applicable not only to BPSK, but also to other modulation schemes that use real-valued constellations. It can also be used to extract real signals from complex signatures that are introduced by factors other than PN spreading waveforms, such as the complex response of multiple receiving antennas used for spatial diversity in wireless communications.

In some preferred embodiments of the present invention, the novel real statistical model is applied in a multi-user decision feedback detector. Like decision feedback detectors known in the art, the constrained decision feedback detector uses decisions made with respect to strong user signals to improve the detection of weaker user signals. By using the novel real statistical model, however, the present detector achieves better performance than prior art detectors.

There is therefore provided method for multi-user detection, including:

receiving a complex input signal due to a superposition of waveforms encoding symbols in a real-valued constellation, which are transmitted respectively by a plurality of transmitters in a common frequency band;

sampling the complex input signal at sampling intervals over the duration of an observation period to provide a sequence of complex samples;

processing the sequence of complex samples to determine soft decision values corresponding to the symbols transmitted by the plurality of the transmitters in the observation period, while constraining the soft decision values to be real values; and projecting the soft decision values onto the constellation to estimate the transmitted symbols.

In a preferred embodiment, the waveforms include code-division multiple access (CDMA) waveforms transmitted by the plurality of the transmitters, and the symbols transmitted by the transmitters are modulated by respective spreading codes to generate the waveforms. Typically, the spreading codes include complex-valued codes.

In a further preferred embodiment, the constellation of the symbols consists of the values +1 and −1, wherein projecting the soft decision values includes taking respective signs of the soft decision values in order to reach a hard decision with respect to the corresponding symbols.

The observation period may have a duration substantially equal to a single symbol period, during which each of the transmitters transmits a single one of the symbols, or it may have a duration during which at least some of the transmitters transmit more than a single one of the symbols.

Preferably, processing the sequence of complex samples includes partitioning the samples into real and imaginary parts, and processing the real and imaginary parts separately to determine the soft decision values. Typically, the real and imaginary parts of the samples are related to the transmitted symbols by an expression having a form $\bar{x}=\bar{S}b+\bar{n}$, wherein $\bar{x}$ is a vector including real vector elements corresponding separately to the real and imaginary parts of the samples, b is a vector including real vector elements corresponding to the values of the symbols, $\bar{S}$ is a matrix including columns corresponding to respective complex signatures of the plurality of the transmitter, the columns including real entries corresponding separately to the real and imaginary parts of the signatures, and $\bar{n}$ is a vector including real vector elements corresponding separately to real and imaginary noise components in the samples, and wherein processing the sequence of complex samples includes inverting the expression to determine the soft decision values of the elements of b.

Preferably, inverting the expression includes finding the real values of the elements of b that minimize a norm given by $\|\bar{x}-\bar{S}b\|^2$, wherein finding the real values of the elements of b includes calculating a vector $\hat{b}$ of the soft decision values so that $\hat{b}=(\bar{S}^T\bar{S})^{-1}\bar{S}^T\bar{x}$.

Alternatively, inverting the expression includes decomposing $\bar{S}$ to yield an upper-triangular matrix T that satisfies an equation $z=Tb+v_1$, wherein z and $v_1$ are vectors obtained by applying a unitary transformation to $\bar{x}$ and $\bar{n}$, respectively, and finding the real values of the elements of b iteratively beginning from a final one of the elements so as to solve the equation. Preferably, processing the sequence of complex samples includes ordering the elements of b in an ascending order of power of the waveforms transmitted respectively by the transmitters, and ordering the entries in $\bar{S}$ according to the order of the elements in b, so that finding the real values iteratively includes finding the real values beginning from one of the transmitters having a high power relative to the other transmitters.

There is also provided, in accordance with a preferred embodiment of the present invention, a multi-user receiver, including:

input circuitry, coupled to receive a complex input signal due to a superposition of waveforms encoding symbols in a real-valued constellation, which are transmitted respectively by a plurality of transmitters in a common frequency band, and to sample the complex input signal at sampling intervals over the duration of an observation period to provide a sequence of complex samples; and multi-user detection circuitry, coupled to receive and process the sequence of complex samples so as to determine soft decision values corresponding to the symbols transmitted by the plurality of the transmitters in the observation period, while constraining the soft decision values to be real values, and to project the soft decision values onto the constellation in order to estimate the transmitted symbols.

The present invention will be more fully understood from the following detailed description of the preferred embodiments thereof, taken together with the drawings in which:

DETAILED DESCRIPTION OF PREFERRED EMBODIMENTS

Figure 1:
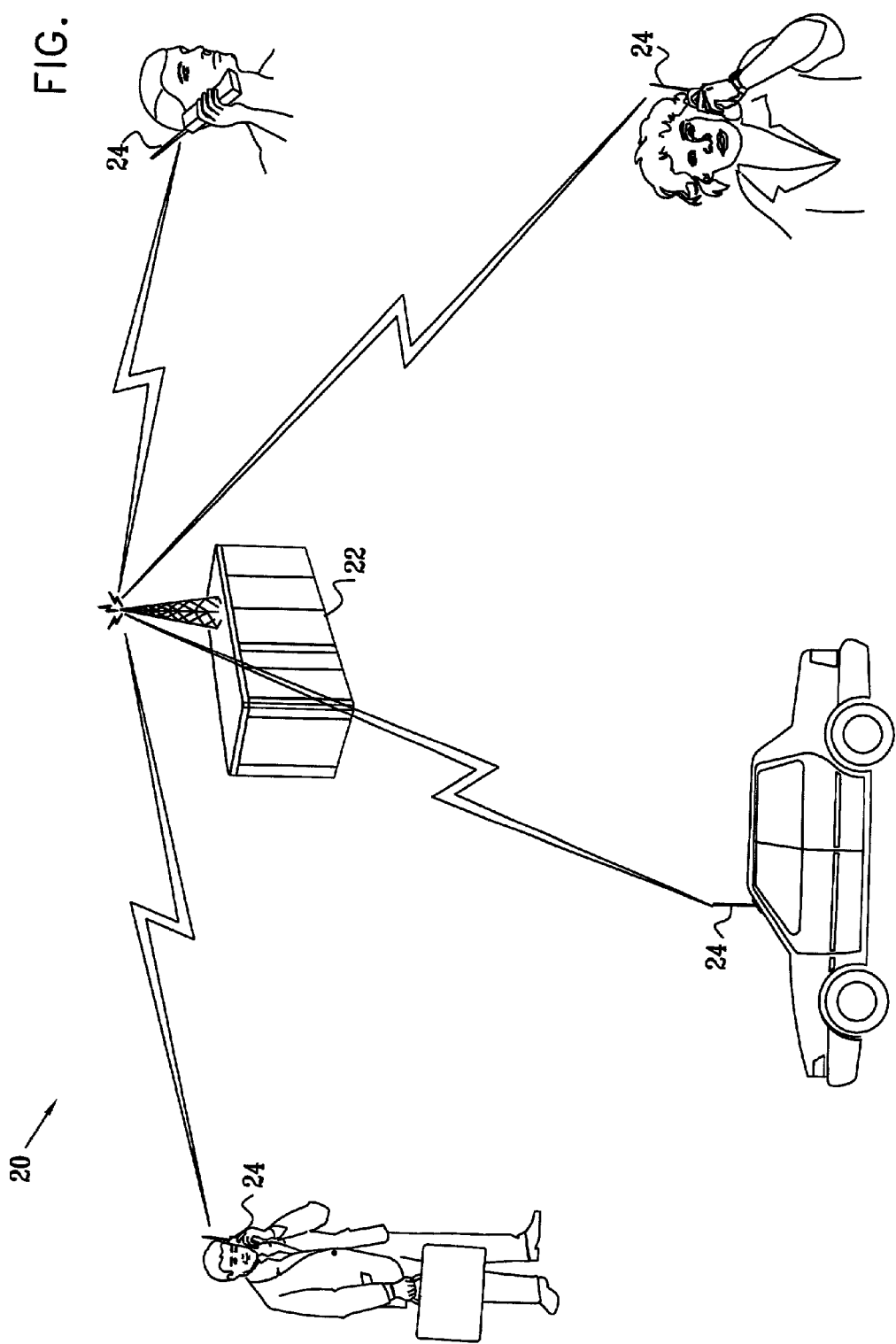
FIG. 1 is a schematic, pictorial illustration of a multi-user communication system, in accordance with a preferred embodiment of the present invention.

FIG. 1 is a schematic, pictorial illustration of a wireless communication system 20, typically a cellular system, in accordance with a preferred embodiment of the present invention. A base station 22 transmits downlink signals to a plurality of users 24, and receives uplink signals from the users in return. The signals are modulated using a DS-CDMA scheme, with BPSK modulation, as described in the Background of the Invention. In order to separate and process the signals that it receives from multiple users 24, base station 22 employs a novel detection scheme using a real statistical model, as described in detail hereinbelow.

Figure 2:
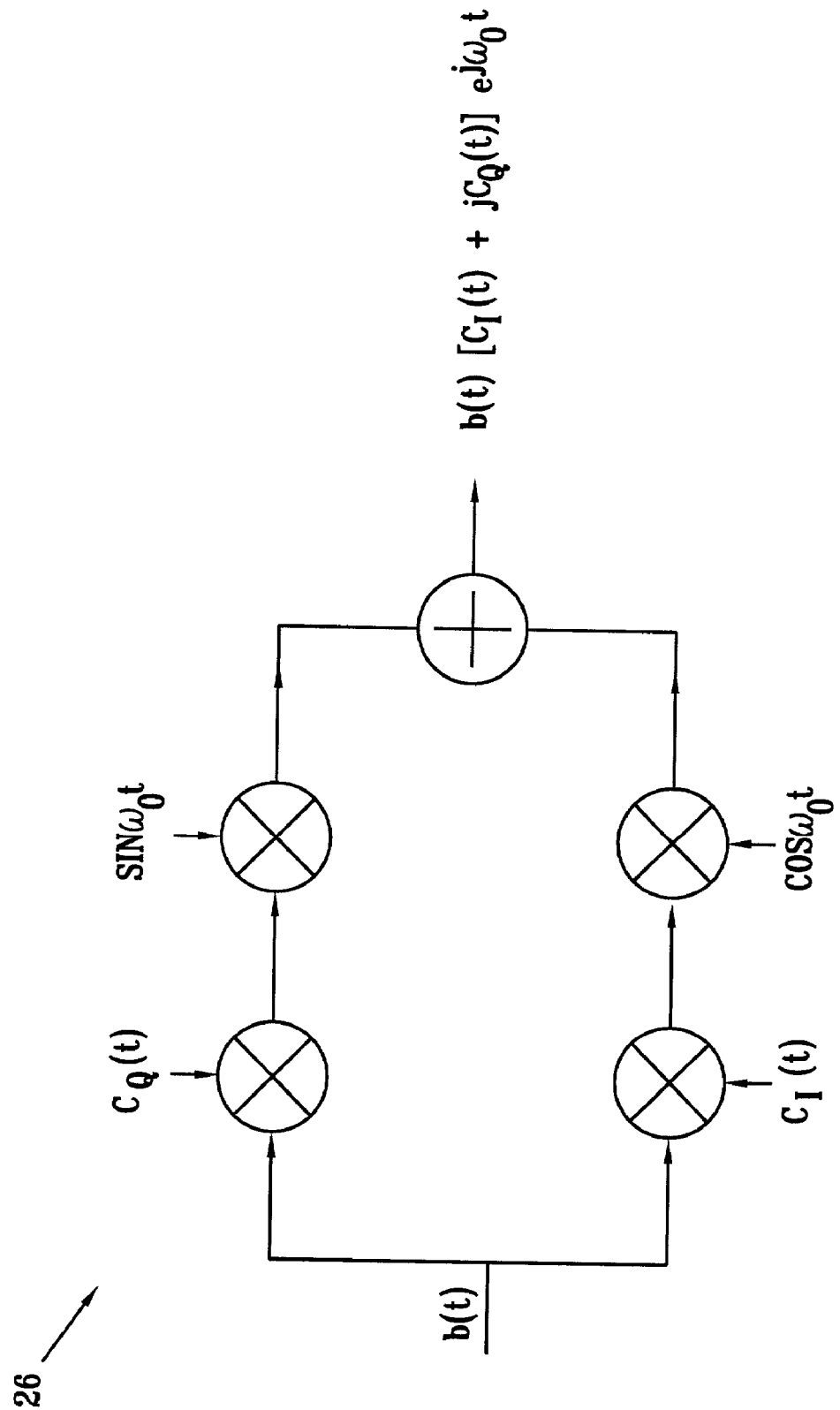
FIG. 2 is a block diagram that schematically illustrates a transmitter operated by a user in the system of FIG. 1.

FIG. 2 is a block diagram that schematically illustrates elements of a transmitter 26 operated by users 24 in system 20. The operation of this transmitter is represented mathematically by equations (2) and (3) above. Each symbol b(t) to be transmitted is multiplied by a complex PN spreading waveform, with different real (I) and imaginary (Q) parts $C_I(t)$ and $C_Q(t)$, respectively. While b(t) is constrained to the real values ±1, the output of transmitter 26 is a complex-valued signal $b(t)[C_I(t)+jC_Q(t)]e^{j\omega_0 t}$, wherein $\omega_0$ is the carrier frequency.

Figure 3:
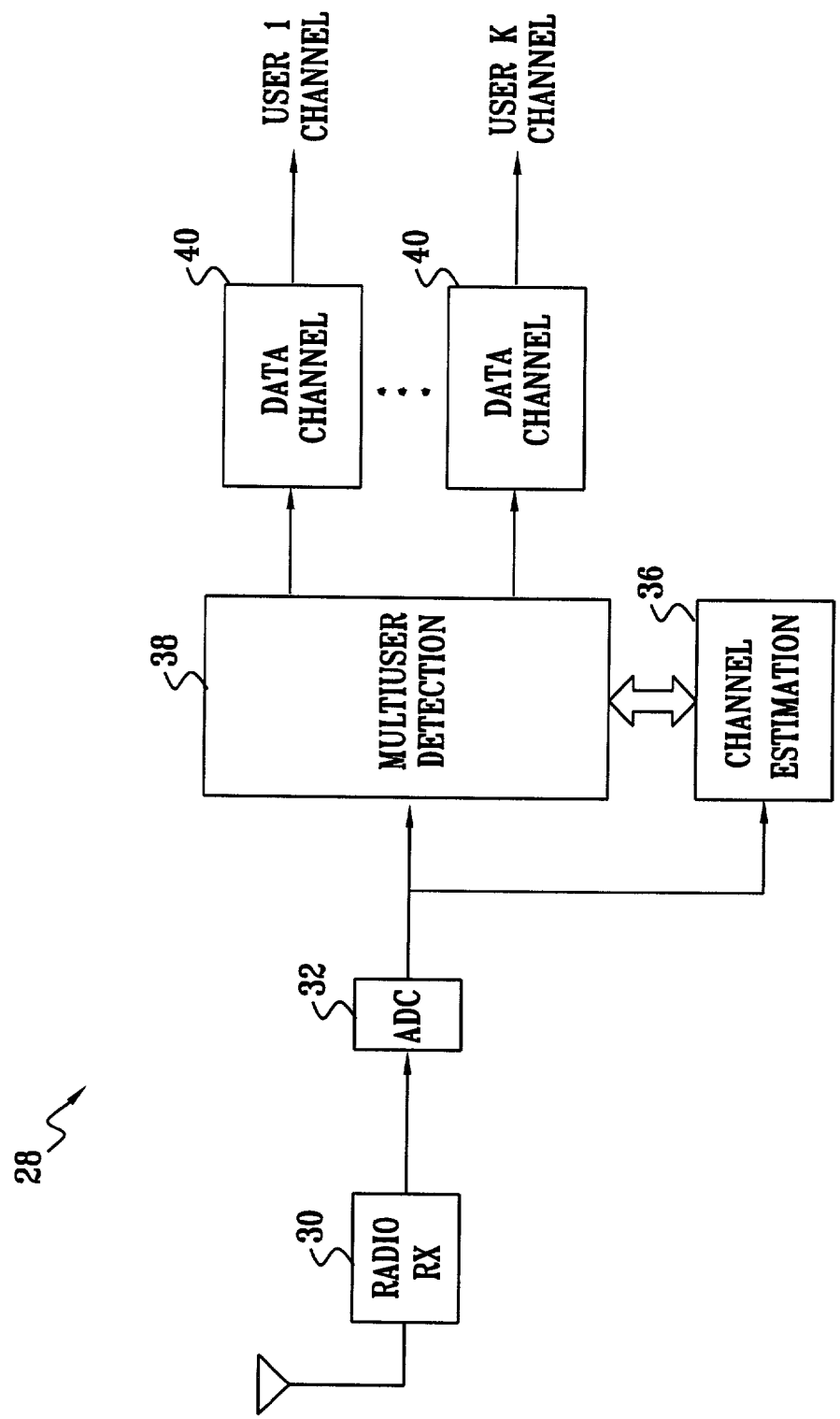
FIG. 3 is a block diagram that schematically illustrates a receiver with multi-user detection capability, in accordance with a preferred embodiment of the present invention.

FIG. 3 is a block diagram that schematically illustrates a receiver 28 used in base station 22 for demodulating and decoding the signals from transmitters 26, in accordance with a preferred embodiment of the present invention. The signals are received over the air by a radio receiver front end 30, and are then digitized by an analog/digital converter (ADC) 32. The design and operation of these elements are well known in the art, as are those of other elements typically used in base station receivers, which would normally be included in receiver 28 but are omitted here for the sake of brevity. ADC 32 provides an input to a multi-user detection block 38 that is substantially of the form given by equation (1). A channel estimator 36, as is known in the art, estimates the respective impulse responses $h_k(t)$ of the user channels for use by block 38.

Multi-user detection block 38 receives the superposed signal of all of users 24, modulated by the respective PN complex signatures of the users. It processes the superposed signal in order to estimate an individual symbol stream $\hat{b}_k(m)$ for each user. The novel operation of block 38 is described in detail hereinbelow. Typically, block 38 comprises a digital signal processor circuit, comprising a single dedicated chip or a group of chips that are configured to carry out the method described below. Alternatively or additionally, some or all of the functions of block 38 may be carried out in software on a suitable general-purpose microprocessor. Still further alternatively or additionally, certain digital processing functions of block 38 that are described below may equivalently be accomplished in the analog domain using suitable matched filters, as are known in the art.

The estimated user symbol streams output by multi-user detection block 38 are input to an individual data processing block 40 for each user. This block performs further data decoding and control channel processing for each user, as is known in the art. The operation of blocks 40 is outside the scope of the present invention.

Multi-user detection block 38 solves equation (5), above, by constraining the soft decision values $\tilde{b}_k$ to the real axis. This model permits equation (5) to be restated as follows in terms of real values only:

$$\bar{x}(m) = \bar{S}(m)b(m) + \bar{n}(m) \tag{8}$$

This equation uses the notation $$\bar{S} := \begin{bmatrix} S_R \\ S_J \end{bmatrix},$$

in which $S_R$ and $S_J$ are the separate real and imaginary parts of S, respectively. Similar notation is used for the complex input signal x and noise n. Equation (8) constitutes a real statistical model, which inherently incorporates prior knowledge that the symbols are real. Taking $b \in R^K$, the solution to $\min \|\bar{x} - \bar{S}b\|^2$ is the real-valued soft decision vector $\tilde{b}$ given by:

$$\tilde{b} = (\bar{S}^T \bar{S})^{-1} \bar{S}^T \bar{x} \tag{9}$$

Here $\bar{S}^T$ is the transpose of $\bar{S}$. The hard decision output of block 38 for each user is simply $\hat{b}_k = \text{sign}(\tilde{b}_k)$.

Because $\tilde{b}$ is constrained to be real, the number of real parameters that must be solved for in equation (8) is only half the number used in methods known in the art, as exemplified by equation (5). In other words, it is evident from this analysis that, at least where BPSK modulation is concerned, methods known in the art use an over-parameterized model for their solution. Over-parameterization tends to increase estimation error, and the inventors have indeed found that in most cases, the constrained decorrelation detector implemented in block 38 achieves a lower bit-error rate (BER) than do decorrelation detectors known in the art. The reduction in the number of parameters also reduces the computational cost of the detector geometrically, so that the cost of block 38 is only about one fourth that of a conventional decorrelating detector for the same number of users. On the other hand, for a given spreading gain N, equation (8) gives 2N simultaneous equations to use in solving for b, which is twice the number given by equation (5). As a result, the usual constraint in decorrelating detectors that the number of users K cannot exceed N is now relaxed to $K \leq 2N$, permitting receiver 28 to handle twice the number of users as could be detected by a conventional decorrelating detector.

Although for the sake of simplicity, equations (8) and (9) relate to samples x(t) collected during a single symbol interval, the method embodied in these equations can readily be extended to multiple successive symbol intervals, i.e., to samples collected over $[0,MT_b)$. Such an extended observation window is typically necessary in order to deal with loss of synchronism among the user signals and to deal with impulse responses $h_k(t)$ whose duration is longer than a single chip period (due to multi-path effects, for example). In this case, the model of equations (1) and (2) can be recast in the following form:

$$x(t) = \sum_{k=1}^{K} \sum_{m=-\infty}^{\infty} b_k(m) \check{s}_k(t, m) + n(t) \tag{10}$$

Here the symbol signature waveform $s_k(t;m)$ of equation (6) is replaced by a composite symbol signature waveform, given by:

$$\check{s}_k(t,m) = h_k(t) * [c_k(t) p_{T_b}(t - mT_b)] \tag{11}$$

The composite symbol signature waveform can vary from symbol to symbol and is of finite duration, say (N+L) chip intervals. The size of L reflects the duration of the impulse responses.

If we now restrict our attention to the particular observation window $[0,MT_b)$, equation (10) can be rewritten as follows:

$$x(t) = \sum_{k=1}^{K} \sum_{m} b_k(m) s_k(t; m) + n(t), \quad 0 \leq t < MT_b \tag{12}$$

wherein $s_k(t;m) := \check{s}_k(t; m) p_{MT_b}(t)$, and the summation in m is over all the symbols having non-zero truncated signatures $s_k(t;m)$ in the observation window. Ordering the symbols according to their signature-start-times, the sample vector x can now be expressed in the form given by equation (5), x=Sb+n, except that now x is a NM×1 vector, and the columns of S are the sampled truncated signatures. Typically, the columns of S contain a few leading zero entries, followed by (N+L) non-zero entries, and ending with tailing zeros.

Because equation (12) is formally identical to equation (5), multi-user detection block 38 can operate on asynchronous signals in the same manner as was described above with respect to synchronous signals. In other words, the restriction of $\tilde{b}$ to real values and the application of equation (9) to find the values of $\tilde{b}_k$ can be performed on asynchronous signals, as well. The performance of block 38 in the asynchronous case depends on the width of the observation window. For ideal channels and an observation window synchronized with a symbol interval of one of the users, b should typically have (2K−1) elements, compared with K elements in the synchronous case. For improved performance under non-ideal conditions, the observation window may be even wider.

Figure 4:
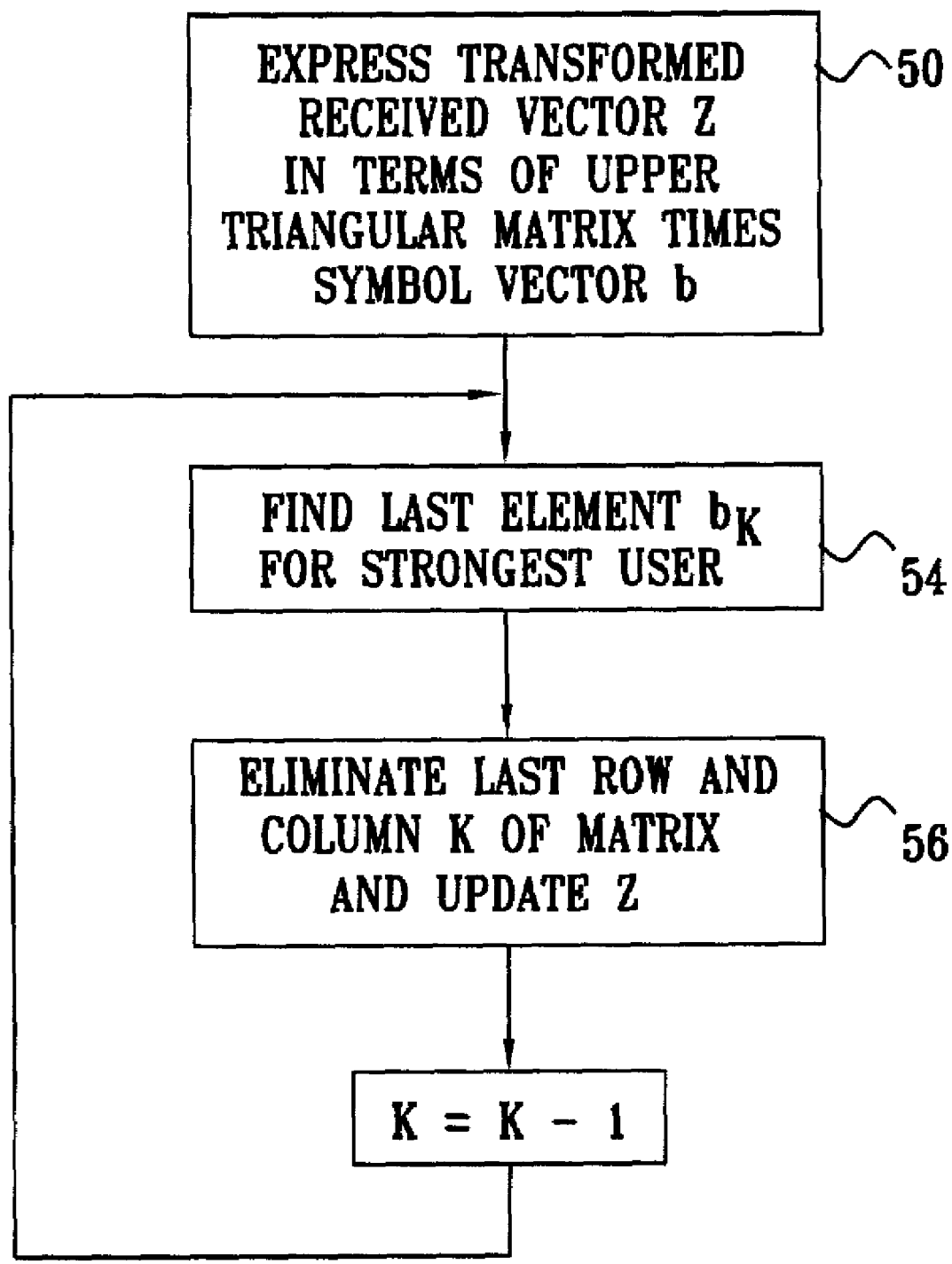
FIG. 4 is a flow chart that schematically illustrates a method for multi-user detection with decision feedback, in accordance with a preferred embodiment of the present invention.

FIG. 4 is a flow chart that schematically illustrates a method for multi-user detection based on decision feedback with the constraint that b is real, in accordance with a preferred embodiment of the present invention. This method can be implemented by multi-user detection block 38 in place of the decorrelation method described above, and gives superior performance when the BER is sufficiently low and reliable estimates of the channel gains are available.

The method begins by recasting equation (8) in terms of an upper triangular matrix T, using QR factorization of matrix $\bar{S}$, as is known in the art, at a signal recasting step 50. The factorization is preferably performed using successive Givens rotations or Householder transformations of the matrix, as described, for example, by Golub and Van Loan in *Matrix Computations* (Johns Hopkins Series in Mathematical Sciences, 1996), which is incorporated herein by reference. Prior to factorization, the columns of the matrix are preferably ordered according to the approximate strengths of the signals received from the respective users, i.e., so that the first column corresponds to the weakest user, and the last column to the strongest.

The QR decomposition at step 50 gives the expression:

$$\bar{S} = QT_1 \tag{13}$$

wherein Q is a 2N×2N unitary matrix, and $T_1$ is a 2N×K upper-triangular matrix having the structure $$T_1 = \begin{bmatrix} T \\ 0 \end{bmatrix},$$

in which T is a K×K upper-triangular matrix. Q can be partitioned into Q=[$Q_1$ $Q_2$], wherein $Q_1$ is a 2N×K matrix having a column span equal to the column span of $\bar{S}$, and $Q_2$ is its complement. In practice, explicit computation of Q is preferably avoided, by applying the Givens rotations to both $\bar{S}$ and $\bar{x}$.

Substituting the representation of equation (13) into equation (8), we are left with the following model:

$$z = Tb + v_1 \quad (14)$$

wherein z:=$Q_1^T \bar{x}$, and $v_1$=$Q_1^T \bar{n}$. Thus, the transformed noise vector $v_1$ remains Gaussian and uncorrelated in character.

Because T is upper-triangular, the last component of $\hat{b}$ is determined simply, at a last element determination step 54, by:

$$\hat{b}_k = \text{sign}\left(\frac{z_K}{T_{KK}}\right) \quad (15)$$

Assuming that the columns of $\bar{S}$ were properly ordered at step 50, this should give the symbol value for one of the strongest user signals, so that the likelihood of error in determining $\hat{b}_k$ is relatively small.

The decision value found at step 54 is substituted back into equation (14) to obtain a dimensionally-reduced model, at a row and column elimination step 56:

$$z^{(K-1)} = T^{(K-1)} b^{(K-1)} + v_1^{(K-1)} \quad (16)$$

Here $b^{(K-1)}$ contains the first K−1 components of b, $T^{(K-1)}$ contains the upper-left (K−1)×(K−1) components of T, and the K−1 components of $z^{(K-1)}$ are given by $Z_i^{(K-1)} = Z_i^{(K)} - T_{iK} \hat{b}_K$. The model of equation (16) is again triangular in structure. Thus, it is now possible to repeat steps 54 and 56, in order to find and eliminate $\hat{b}_{k-1}$. The method then proceeds iteratively in this manner until all of the elements of $\hat{b}$ have been found.

The decision feedback method of FIG. 4 can also be applied, mutatis mutandis, to the asynchronous case discussed above. For large observation windows (large M), the matrix S is a sparse, banded matrix, having at most N+L non-zero entries in each column, located near the matrix diagonal. Banded structures can be exploited to reduce the computational cost of QR decomposition. $\bar{S}$ as defined above, however, loses its banded structure. The banding can be restored if $\bar{x}$ is redefined in such a way that the real and imaginary parts of successive samples are interleaved:

$$\bar{x} := ((x_1)_\Re, (x_1)_\Im, (x_2)_\Re, (x_2)_\Im, \ldots, (x_N)_\Re, (x_N)_\Im)^T \quad (17)$$

Now the first row of $\bar{S}$ will contain the real part of the first row of S, the second row of $\bar{S}$ will contain the imaginary part of the first row of S, and so forth. The real model of equation (8) is still preserved by this new structure, so that the methods of decorrelation and decision feedback detection described above can be applied here, too.

Although preferred embodiments are described hereinabove with reference to multi-user detection of wireless DS-CDMA signals, with BPSK modulation and complex PN code waveforms, the principles of the present invention may be applied to other multi-user detection problems. For example, when base station 22 uses multiple antennas for spatial diversity, the individual user signatures will be complex even when the PN waveforms are real-valued, due to the inherent complex response of the antennas.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for multi-user detection, comprising:
    receiving a complex input signal due to a superposition of waveforms encoding symbols in a real-valued constellation, which are transmitted respectively by a plurality of transmitters in a common frequency band;
    sampling the complex input signal at sampling intervals over the duration of an observation period to provide a sequence of complex samples;
    processing the sequence of complex samples to determine soft decision values corresponding to the symbols transmitted by the plurality of the transmitters in the observation period, while constraining the soft decision values to be real values; and
    projecting the soft decision values onto the constellation to estimate the transmitted symbols,
    wherein processing the sequence of complex samples comprises partitioning the samples into real and imaginary parts, and processing the real and imaginary parts separately to determine the soft decision values, and
    wherein the real and imaginary parts of the samples are related to the transmitted symbols by an expression having a form $\bar{x} = \bar{s}b + \bar{n}$,
    wherein $\bar{x}$ is a vector comprising real vector elements corresponding separately to the real and imaginary parts of the samples, b is a vector comprising real vector elements corresponding to the values of the symbols, $\bar{S}$ is a matrix comprising columns corresponding to respective complex signatures of the plurality of the transmitters, the columns comprising real entries corresponding separately to the real and imaginary parts of the signatures, and $\bar{n}$ is a vector comprising real vector elements corresponding separately to real and imaginary noise components in the samples, and
    wherein processing the sequence of complex samples comprises inverting the expression to determine the soft decision values of the elements of b.

2. The method according to claim 1, wherein the waveforms comprise code-division multiple access (CDMA) waveforms transmitted by the plurality of the transmitters, and wherein the symbols transmitted by the transmitters are modulated by respective spreading codes to generate the waveforms.

3. The method according to claim 2, wherein the spreading codes comprise complex-valued codes.

4. The method according to claim 1, wherein the constellation of the symbols consists of the values +1 and −1.

5. The method according to claim 4, wherein projecting the soft decision values comprises taking respective signs of the soft decision values in order to reach a hard decision with respect to the corresponding symbols.

6. The method according to claim 1, wherein the observation period has a duration substantially equal to a single symbol period, during which each of the transmitters transmits a single one of the symbols.

7. The method according to claim 1, wherein the observation period has a duration during which at least some of the transmitters transmit more than a single one of the symbols.

8. The method according to claim 1, wherein inverting the expression comprises finding the real values of the elements of b that minimize a norm given by $\|\bar{x}-\bar{S}b\|^2$.

9. The method according to claim 8, wherein finding the real values of the elements of b comprises calculating a vector $\tilde{b}$ of the soft decision values so that $$\tilde{b} = (\bar{S}^T\bar{S})^{-1}\bar{S}^T\bar{x}.$$

10. The method according to claim 1, wherein inverting the expression comprises:
  decomposing $\bar{S}$ to yield an upper-triangular matrix T that satisfies an equation $z=Tb+V_1$, wherein z and $V_1$ are vectors obtained by applying a unitary transformation to $\bar{x}$ and $\bar{n}$, respectively; and
  finding the real values of the elements of b iteratively beginning from a final one of the elements so as to solve the equation.

11. The method according to claim 10, wherein processing the sequence of complex samples comprises ordering the elements of b in an ascending order of power of the waveforms transmitted respectively by the transmitters, and ordering the entries in $\bar{S}$ according to the order of the elements in b, so that finding the real values iteratively comprises finding the real values beginning from one of the transmitters having a high power relative to the other transmitters.

12. The multi-user receiver, comprising:
  input circuitry, coupled to receive a complex input signal due to a superposition of waveforms encoding symbols in a real-valued constellation, which are transmitted respectively by a plurality of transmitters in a common frequency band, and to sample the complex input signal at sampling intervals over the duration of an observation period to provide a sequence of complex samples; and
  multi-user detection circuitry, coupled to receive and process the sequence of complex samples so as to determine soft decision values corresponding to the symbols transmitted by the plurality of the transmitters in the observation period, while constraining the soft decision values to be real values, and to project the soft decision values onto the constellation in order to estimate the transmitted symbols,
  wherein the multi-user detection circuitry is arranged to partition the samples into real and imaginary parts, and to process the real and imaginary parts separately to determine the soft decision value, and
  wherein the real and imaginary parts of the samples are related to the transmitted symbols by an expression having a form $\bar{x}=\bar{S}b+\bar{n}$,
  wherein $\bar{x}$ is a vector comprising real vector elements corresponding separately to the real and imaginary parts of the samples, b is a vector comprising real vector elements corresponding to the values of the symbols, S is a matrix comprising columns corresponding to respective complex signatures of the plurality of the transmitters, the columns comprising real entries corresponding separately to the real and imaginary parts of the signatures, and $\bar{n}$ is a vector comprising real vector elements corresponding separately to real and imaginary noise components in the samples, and
  wherein the multi-user detection circuitry is arranged to invert the expression to determine the soft decision values of the elements of b.

13. The multi-user receiver according to claim 12, wherein the waveforms comprise code-division multiple access (CDMA) waveforms transmitted by the plurality of the transmitters, and wherein the symbols transmitted by the transmitters are modulated by respective spreading codes to generate the waveforms.

14. The multi-user receiver according to claim 13, wherein the spreading codes comprise complex-valued codes.

15. The multi-user receiver according to claim 12, wherein the constellation of the symbols consists of the values +1 and −1.

16. The multi-user receiver according to claim 15, wherein the multi-user detection circuitry is arranged to take respective signs of the soft decision values in order to reach a hard decision with respect to the corresponding symbols.

17. The multi-user receiver according to claim 12, wherein the observation period has a duration substantially equal to a single symbol period, during which each of the transmitters transmits a single one of the symbols.

18. The multi-user receiver according to claim 12, wherein the observation period has a duration during which at least some of the transmitters transmit more than a single one of the symbols.

19. The multi-user receiver according to claim 12, wherein the multi-user detection circuitry is arranged to invert the expression by finding the real values of the elements of b that minimize a norm given by $\|\bar{S}b\|^2$.

20. The multi-user receiver according to claim 19, wherein the multi-user detection circuitry is arranged to find the real values of the elements of b by calculating a vector $\tilde{b}$ of the soft decision values so that $\tilde{b}=(\bar{S}^T\bar{S})^{-1}\bar{S}^T\bar{x}$.

21. The multi-user receiver according to claim 12, wherein the multi-user detection circuitry is arranged to decompose S to yield an upper-triangular matrix T that satisfies an equation $z=Tb+v_1$, wherein z and $v_1$ are vectors obtained by applying a unitary transformation to $\bar{x}$ and $\bar{n}$, respectively, and to find the real values of the elements of b iteratively beginning from a final one of the elements so as to solve the equation.

22. The multi-user receiver according to claim 21, wherein the multi-user detection circuitry is arranged to order the elements of b in an ascending order of power of the waveforms transmitted respectively by the transmitters, and to order the entries in $\bar{S}$ according to the order of the elements in b, so as to find the real values iteratively beginning from one of the transmitters having a high power relative to the other transmitters.

* * * * *